Sept. 29, 1936.　　L. R. TALLMAN ET AL　　2,055,677
COMBINATION BALER AND MOWER
Filed April 25, 1935　　2 Sheets-Sheet 1
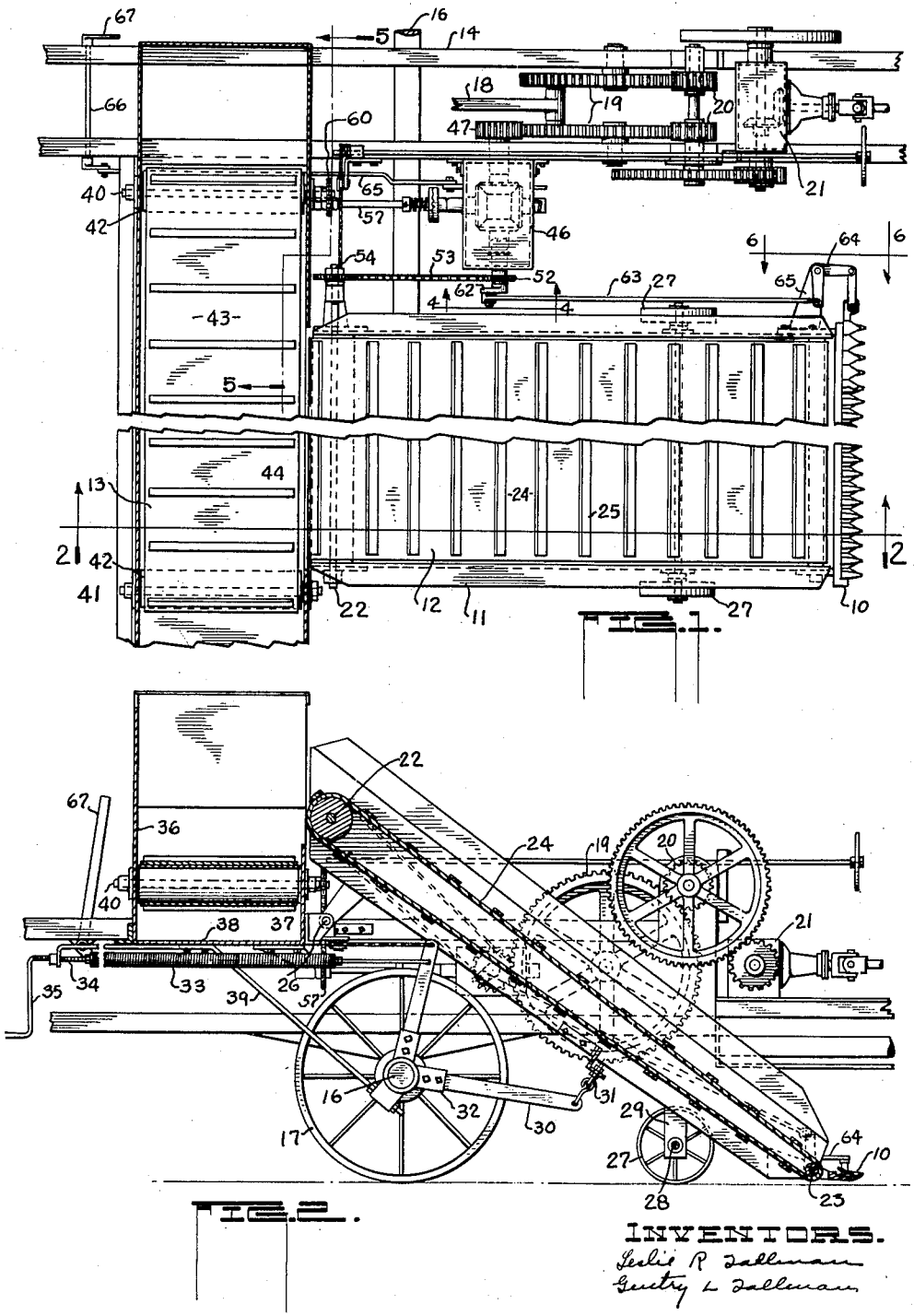

Sept. 29, 1936. L. R. TALLMAN ET AL 2,055,677
COMBINATION BALER AND MOWER
Filed April 25, 1935  2 Sheets-Sheet 2
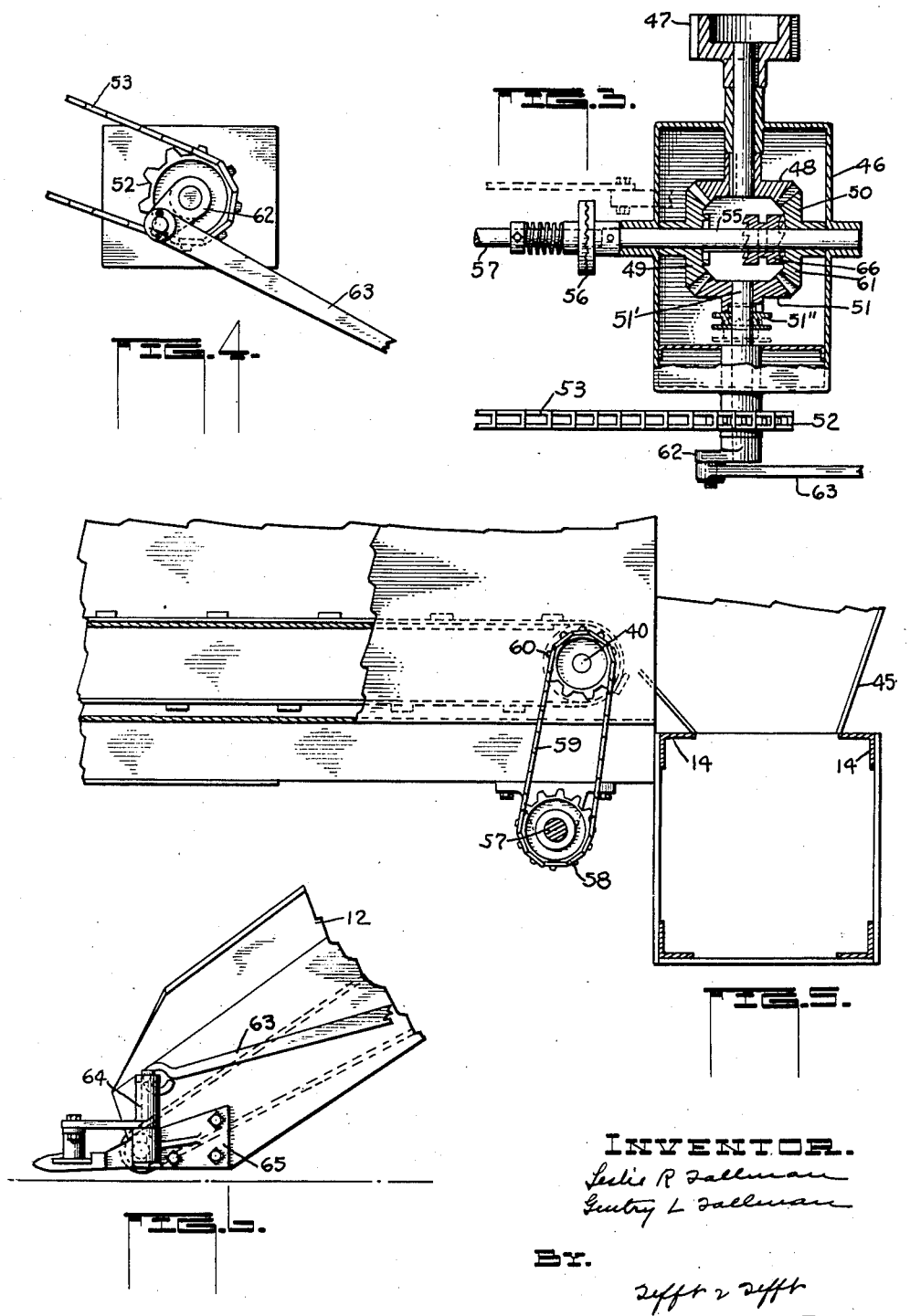

Patented Sept. 29, 1936

2,055,677

UNITED STATES PATENT OFFICE 2,055,677

COMBINATION BALER AND MOWER

Leslie R. Tallman and Gentry L. Tallman, Shelbyville, Ill.

Application April 25, 1935, Serial No. 18,193

2 Claims. (Cl. 56—23)

This invention is directed to combine balers and has for one of its objects to provide a combination including a baler, means for transporting plant stalks thereinto and a mower for cutting the stalks for the purpose of baling.

Another object is to provide a mower attached to and co-operating with a conveyor mechanism which latter is adapted to transport plant fibres cut by the mower into an associated baler in a substantially continuous stream and means for interrupting the stream flowing into the baler without stopping the cutting operation.

An additional object is to provide a combined baler and mower mechanism adapted to continuously cut plant fibres and conveyor devices adapted to feed the same into the baler in successive separated portions.

A further object is to provide a combined baler and mower mechanism as aforesaid in which the plant fibres are fed to the baler in successive separated portions, said mechanism including manual control means whereby the size of the portions is optionally regulated.

Other and additional objects will appear in the following description and accompanying drawings in which:

Fig. 1 is a plan view, partly fragmented, showing the general arrangement of elements;

Fig. 2 is a side elevational sectional view taken on line 2—2 in Fig. 1;

Fig. 3 is an enlarged fragmental sectional view showing detail of control mechanism to be described;

Fig. 4 is a fragmental detail view showing parts to be explained, taken from line 4—4 in Fig. 1;

Fig. 5 is a side elevational sectional view taken on line 5—5 in Fig. 1; and

Fig. 6 is a fragmental detail view showing parts to be explained, taken from line 6—6 in Fig. 1.

Before proceeding with the description it may be in order to note that in harvesting certain farm crops, for example, wheat and oats, modern methods include the use of well known harvesting machines known as "combines".

For the sake of efficiency in harvesting such crops the cutters of the combine are set to crop off only the tops or heads of the plants, leaving a high stubble.

The stubble portion represents the straw which was produced incidental to former harvesting and threshing methods, wherein the grain stalks were cut close to the ground.

Since the straw left standing in the fields, after harvesting with a combine, is a valuble commodity, it has been found profitable to harvest the straw in a separate operation. We now provide a combined mower and baler which may be drawn through a field of stubble to cut and bale the same, ready for market, in a single operation, whereby a valuable crop now extensively wasted, may be economically harvested and sold.

While straw is herein used as an example of a crop to be cut and baled, we do not wish to infer that the utility of our device is limited to the harvesting of any particular type of crop and we intend it to be used for harvesting any material which it may be desirable to cut and bale in the field.

Referring to the drawings, Figs. 1 and 2 disclose our invention as generally comprising a mower mechanism 10 supported upon the frame structure 11 of an inclined conveyor 12 which is adapted to receive straw cut by the mower and transport the same to an elevated cross feed conveyor mechanism 13 which is arranged to transport the straw into a baler mechanism 14. Baler mechanisms of the type used are thought sufficiently well known to obviate detail illustration and description herein further than to say that its frame structure is carried upon a shaft 16 mounted for transport on a pair of wheels 17, only one of which is shown.

Mechanism for operating the plunger head of the baler, not shown, includes a pitman 18 connected to the head and connected with the driving mechanism by means of a pin disposed between a pair of gears 19 which are driven by pinions 20 which may in turn be driven through a power take-off mechanism 21 operated by an associated tractor not shown, or by an independent power plant mounted upon the baler frame.

The mower 10 comprises the conventional cutter and sickle mechanism attached to the lower end of the frame structure 11 of conveyor 12 as shown.

Conveyor 12 comprises a supporting frame structure designated 11, carrying upper and lower shafts 22 and 23.

Shafts 22 and 23 carry pulleys which in turn carry a belt member 24, provided with transverse slats 25.

The frame structure of conveyor 12 is supported at its upper end by means of a pivotal connection at 26 upon the frame structure of the cross feed conveyor 13 and at its lower, outboard end partly by ground wheels 27 mounted upon the frame structure by means of a shaft 28 supported in bracket members 29. The ground wheels support only a portion of the weight of the structure, only a sufficient portion to insure firm contact with the ground whereby to hold the cutter mechanism properly spaced therefrom so that the cutter mechanism may follow the contour of the field with fidelity.

The principal portion of the weight is resiliently supported upon shaft 16 by means of a mechanism including an outwardly directed arm 30 connected with the frame structure by means of a link mechanism 31.

The arm 30 is affixed to a hub structure 32 which is supported on shaft 16. The hub structure also carries an upright arm to which is attached a spring 33, anchored upon the cross feed conveyor structure by means of a threaded bar 34 terminating in a crank 35 by means of which the bar is rotated to longitudinally adjust the bar 34 to adjust the tension of spring 33 whereby the amount of weight carried by arm 30 is controlled and the weight resting upon wheels 27 is made to suit conditions of the ground over which the device is operated.

The cross feed conveyor structure includes side frame members 36 and 37 and a bottom member 38.

The inner end of the structure is supported upon the baler frame structure and the outer end is supported upon shaft 16 by means of a brace member 39.

The structure carries shafts 40 and 41 to which are affixed pulleys 42 carrying a belt 43 provided with transverse slats 44. At the inner end of the conveyor, and disposed over the baler is a hopper-like structure 45 adapted to guide straw ejected from the conveyor into the baler. The arrangement is best shown in Fig. 5.

Driving means for the several elements is provided through a control unit 46 which is supported upon the baler frame structure. This unit comprises a pinion 47 meshing with one of the gears 19 through which power for driving the cutter-conveyor mechanism is transmitted.

Pinion 47 has driving connection with a gear 48 which is meshed with oppositely disposed gears 49 and 50 which in turn mesh with a fourth gear 51.

Gear 51 is rotatably mounted upon a shaft 51' journalled in the frame structure of the unit and the shaft carries a keyed clutch member 51'' which has dentures in the face of its hub adapted to engage similar dentures formed in the face of the hub of gear 51 whereby to establish driving connection between shaft 51' and the gear.

Shaft 51' carries a sprocket 52 and a crank 62.

Sprocket 52 has driving connection, through a chain 53, with a sprocket 54 affixed to conveyor shaft 22.

Crank 62 carries one end of a connecting rod 63, the opposite end of which is connected to one arm of a bell crank 64 pivotally supported upon the frame structure of conveyor 12 by means of a bracket fixture 65.

The other arm of bell crank 64 is connected with the sickle member of the mower 10.

The shaft 55, upon which gears 49 and 50 are rotatably mounted, has driving connection through a breakable connection 56, with a shaft 57 carrying a sprocket 58. A chain 59 connects the latter sprocket with a sprocket 60 affixed to shaft 40 of the cross feed conveyor.

Gears 49 and 50 are rotatably mounted upon shaft 55 and have denture portions formed on their inner faces and shaft 55 carries a clutch member 61 between the gears in a slidably keyed relation. Clutch 61 has dentures upon its outer faces adapted to engage the dentures of either of gears 49 and 50, whereby to cause rotation of shaft 55 in unison with the engaged gear.

Clutching mechanisms of the type above described and their operative means are thought sufficiently well known to obviate detail description herein. It is considered sufficient to note that the clutches of the control unit are made manually operable from a remote station on the opposite side of the baler through a bar 65 which is connected, through a shaft 66 mounted on the baler frame, with a handle 67. By means of the handle an operator is capable of controlling the mechanism of the control unit.

In operation the apparatus is drawn through a field with the power source operating and gears 48, 49, 50 and 51 in rotation.

The mower 10 and conveyor 12 are placed in operation by means of adjustment of clutch 51'' whereby the mower cuts the straw, which falls upon belt 26 and is transported upwardly to discharge onto cross feed conveyor 13.

By means of selective positioning of clutch 61 the cross feed conveyor is normally driven in direction to transport the straw toward the baler, the hopper structure 45 assisting the straw properly to fall into the baler.

It is well known that in the work of baling it becomes necessary to interrupt the stream of straw falling into the baler for the purpose of inserting a separating block so as to separate the straw into portions to form bales of suitable size.

To interrupt the movement of the stream as noted we provide that the direction of travel of the cross feed conveyor may be reversed whereby the stream falling from conveyor 12 is transported in direction away from the baler, by which means the continuity of the stream is broken. Since the time required to insert a block as noted is usually short, the time during which the conveyor is operated in reverse direction is correspondingly short, and immediately after the block is inserted the conveyor is caused to resume forward travel.

To accomplish the reversal noted, we provide the clutch mechanism 66. It will be apparent that the clutch, operated by handle 67, may be operated to cause rotation of shaft 57 in either direction. When the operator desires to insert a block, he operates handle 67 to move clutch 66 into position for reverse rotation, places the block and replaces the handle to cause resumption of normal rotation.

The foregoing has described an embodiment of our invention. Modifications of structure are obviously possible without alteration of principle. We do not wish to be limited in structure or function except within the scope of the appended claims.

What we claim is:

1. A cutting and feeding device for portable balers comprising a conveyor having one end disposed to discharge into a baler, a second conveyor having one end disposed to discharge into the first conveyor and its opposite end supported near the ground, a cutter mechanism disposed in front of the second conveyor adapted to cut hay which falls upon the second conveyor to be transported thereby to the first conveyor, a power mechanism on the baler, a power distributing mechanism driven thereby, driving connection between the power distributing mechanism and said conveyors, the power distributing mechanism having its elements arranged so as to be capable of driving said first conveyor in reverse directions independently of the second conveyor and mower and manual means controlling said distributing mechanism.

2. A cutting and feeding device for portable balers comprising a conveyor having one end disposed to discharge into a baler, a second conveyor having one end disposed to discharge into the first conveyor and its opposite end supported near the ground, a cutter mechanism disposed in front of the second conveyor adapted to cut hay which falls upon the second conveyor to be transported thereby to the first conveyor, a power mechanism on the baler, a power distributing mechanism driven thereby, connection between the power distributing mechanism and said conveyors and cutter and manual means on the baler controlling the distributing mechanism to cause reverse operation of the first conveyor independently of the second conveyor and mower.

LESLIE R. TALLMAN.
GENTRY L. TALLMAN.